United States Patent
Frank, Jr. et al.

(10) Patent No.: US 6,691,226 B1
(45) Date of Patent: Feb. 10, 2004

(54) COMPUTER SYSTEM WITH DISK DRIVE HAVING PRIVATE KEY VALIDATION MEANS FOR ENABLING FEATURES

(75) Inventors: Charles W. Frank, Jr., Irvine, CA (US); Thomas D. Hanan, Mission Viejo, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 0 days.

(21) Appl. No.: 09/270,041

(22) Filed: Mar. 16, 1999

(51) Int. Cl.[7] .............................................. G06F 1/00
(52) U.S. Cl. ........................ 713/100; 380/262; 380/4; 713/1; 713/183; 713/193; 713/194; 713/202; 360/900; 711/153; 711/164; 711/173
(58) Field of Search ...................... 380/262, 4; 713/1, 713/100, 183, 193, 194, 202; 360/900; 711/153, 164, 173

(56) References Cited

U.S. PATENT DOCUMENTS

| | | | | |
|---|---|---|---|---|
| 5,012,514 A | * | 4/1991 | Renton ........................... 380/4 |
| 5,375,243 A | * | 12/1994 | Parzych et al. ............. 395/725 |
| 5,675,769 A | * | 10/1997 | Ruff et al. ............. 395/497.04 |
| 5,678,043 A | | 10/1997 | Ng et al. |
| 5,757,907 A | * | 5/1998 | Cooper et al. ................. 380/4 |
| 5,805,932 A | | 9/1998 | Kawashima et al. |
| 6,044,154 A | * | 3/2000 | Kelly ........................... 380/28 |

FOREIGN PATENT DOCUMENTS

WO  WO 98/25199  6/1998

* cited by examiner

Primary Examiner—Gregory Morse
Assistant Examiner—Paul Callahan
(74) Attorney, Agent, or Firm—Milad G. Shara, Esq.; Alan W. Young, Esq.

(57) ABSTRACT

A computer system having a host computer is connected to a disk drive for providing a key to enable a feature controlled by the disk drive. The disk drive validates the key using private validation means which are accessed by a disk drive microprocessor. The validation means include drive-dependent identification means which are used to derive a seed for generating an internal key to validate the key provided by the host computer. An exemplary feature enabled by the key validation is an expansion area of the disk drive which is enabled to provide extended user data storage without requiring internal physical access by the user.

7 Claims, 5 Drawing Sheets

COMPUTER SYSTEM WITH DISK DRIVE HAVING PRIVATE KEY VALIDATION MEANS FOR ENABLING FEATURES

BACKGROUND

1. Field of the Invention

The invention relates to disk drives in computer systems. In particular the invention relates to disk drives in computer systems having private means for validating a key to enable features.

2. Description of the Related Art

Virtually all personal computer systems sold to users today include a disk drive for mass storage of programs and data. The user of the computer often has little awareness of the individual characteristics of the disk drive other than its storage capacity, hence he views the disk drive as an anonymous and generic component. The user's view of the disk drive as anonymous and generic is encouraged by computer systems manufacturers, known as original equipment manufacturers (OEMs), because they prefer to source and integrate disk drives from multiple vendors at a fixed capacity point, and consequently discourage product differentiation by vendors. This practice severely limits the opportunities for a disk drive vendor to receive a return for features which they wish to include as a competitive advantage.

As an example, the storage capacity which can be provided by a disk drive may be primarily determined by the areal density which can be achieved with a given combination of heads, media, channel electronics, formatting and servo algorithms. As a disk drive matures during its production life, the potentially achievable areal density frequently increases significantly. However the business limitation of having to provide a fixed capacity point for integration into a computer system prevents the potentially increased capacity from being delivered.

Another problem is that the OEM may wish to dynamically change the mix of disk drive capacities in his product line, but is limited in his options to do so because he must commit to certain capacities far enough in advance to allow the disk drive suppliers to meet the demand.

Another problem is that users may find a need to upgrade the capacity of the disk purchased with their computer system, but are reluctant to do so because such upgrading requires opening the computer enclosure and performing tasks which they may find daunting.

Still another problem is that, although a disk drive vendor can develop and incorporate a number of features or improvements in his product which are potentially salable to an end user, the. anonymity of the disk drive in the computer system is a barrier and a viable and secure way to enable users to unlock the features or improvements has not heretofore been provided.

There is therefore a continuing need for a simple and secure means to enable disk drive or computer system manufacturers to provide enhanced features and product variations for which they can be compensated, while remaining compatible with the requirements of OEMs to have access to multiply sourced disk drives.

SUMMARY OF THE INVENTION

This invention can be regarded as a disk drive having a drive microprocessor and a means for drive-dependent identification. The means for drive-dependent identification are privately accessible by the drive microprocessor. The disk drive further comprises a means for receiving a key and a means for validating the key. The means for validating the key comprises a validation program which is privately accessed and executed by the drive microprocessor and a seed component. Preferably the seed component is derived from the means for drive-dependent identification.

In another aspect the invention can be regarded as disk drive having the above described key validation means and a physical capacity comprising an expansion portion and a user portion wherein the expansion portion has data sectors which can be converted to user portion data sectors when a key is validated.

The invention can also be regarded as a computer system having a host computer and a disk drive as described above wherein the host computer has a means for providing the key to disk drive.

In yet another aspect, the invention can be regarded as a method for validating a key for enabling a feature in a disk drive comprising the steps of receiving a key from the host computer; retrieving seed elements from a private area of the disk drive; generating an internal key in the disk drive; comparing the internal key to the key received from the host computer to determine if the received key is valid; and if the received key is valid, enabling the feature.

The foregoing and other features of the invention are described in detail below and set forth in the appended claims.

DETAILED DESCRIPTION

Figure 1:
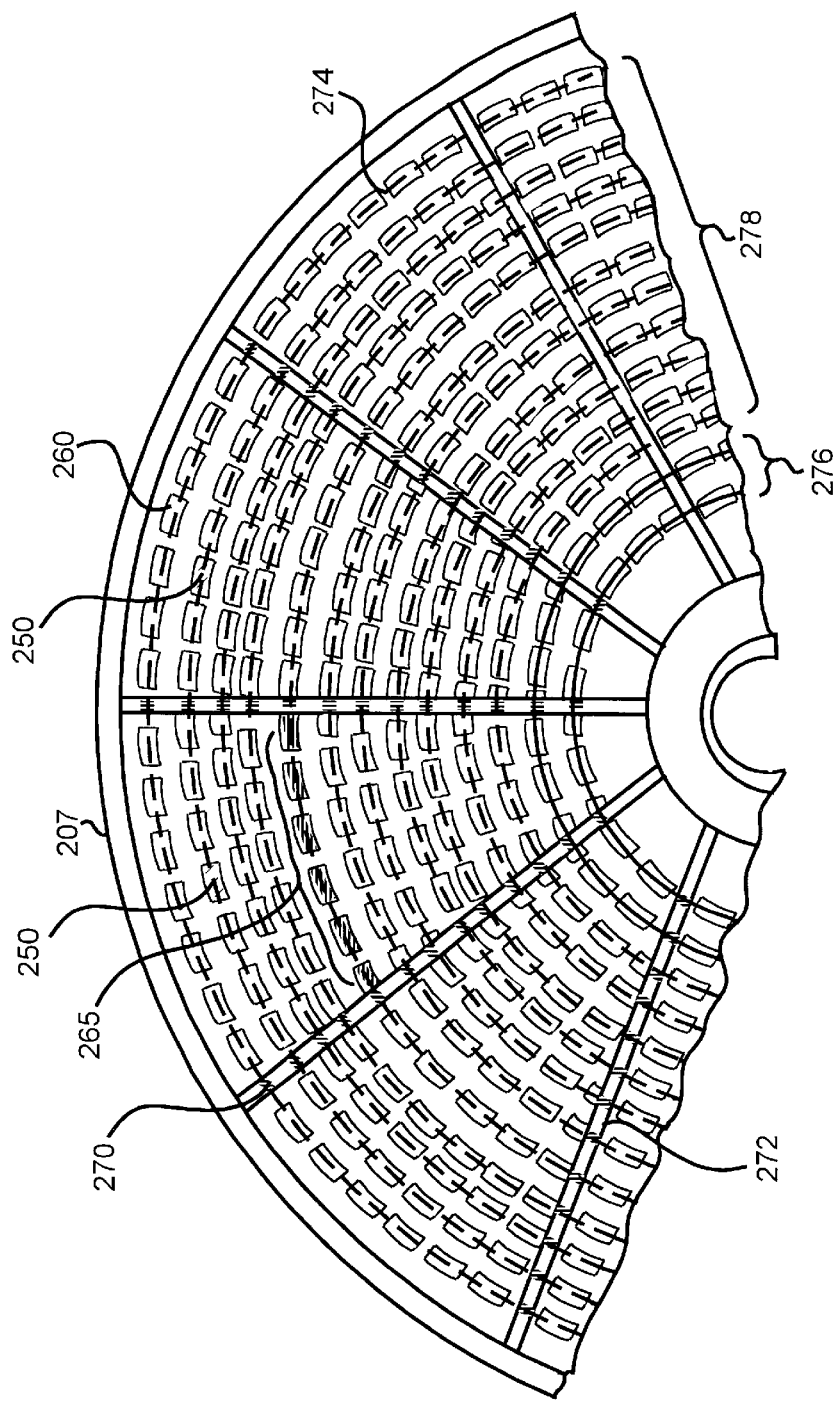
FIG. 1 is a portion of a prior art disk surface illustrating data sectors apportioned between user data, spares, and reserve areas, the sum of which in the entire disk drive comprises the physical capacity of the disk drive.

FIG. 1 illustrates a portion of one surface of a prior art disk 207 commonly used in disk drives for storing large volumes of data. As is well known, a disk drive may have multiple such disks 207 with data stored on both an upper and lower surface, however the portion shown is sufficient to point out relevant aspects of the disk 207 which are common to all disks in a disk drive.

A plurality of radially concentric tracks are provided on disk 207, shown as dashed lines such as 274 in FIG. 1. In a disk drive having multiple surfaces for data storage, each radially concentric track on a given surface is identified with a unique number indicating its position. The position is generally termed a "cylinder" to provide a reference for radial positions common to each of stacked disk surfaces in the disk drive. The disk drive industry presently prefers to use an embedded servo process where servo sectors such as one indicated at 270 are dispersed at regular intervals around each track or cylinder forming spokes such as one indicated at 272. The embedded servo technique provides samples of position information at regular periods to move and maintain a read/write transducer over a selected track using a servo system.

Data is stored on each track 274 in the "wedge" defined between servo spokes 272 using uniformly sized storage units called data sectors 260, shown as rectangular elements. Using well known techniques, a data sector 260 may be split if interrupted by a servo spoke 272. In a further well known technique, the frequency at which a data is sector is written is varied in radial "zones" across the disk surface to provide for efficient storage.

During manufacturing of the disk drive, each data sector is tested to ensure that it is capable of reliably storing data. Due to surface anomalies of the disk media, some sectors may be found defective and are marked as unusable defect sites 250. Further, to provide for defect sites which may manifest themselves during the operating life of the disk drive, a plurality of spare sites 265 are designated.

The disk drive requires a certain amount of private storage, used to store program overlays, maps of the layout of data sectors, zone information, and other operating parameters necessary to operate the disk drive. This private storage is generally termed a reserve area 276, indicated by the tracks having solid lines. The reserve area or reserve cylinders are uniquely identified so as to distinguish the reserve area 276 from a user area 278 which contains the storage available to the user.

A user capacity is defined by the sum in bytes stored in within user area 278 comprising all the data sectors 260 on all tracks or cylinders 274 which are neither defective sites 250, nor spares 265. Conventionally, the host computer view of the disk drive references stored data in units of logical blocks or logical block addresses (LBA's) each typically providing 512 bytes of user storage. The disk drive has a control microprocessor which translates LBA's into physical data sectors and vice-versa. The capacity in bytes is sometimes calculated as the multiple of logical blocks times block size; e.g. 512 bytes per block.

There are therefore, two common capacity measures of a disk drive. The user capacity—calculated as indicated above and expressed in millions of bytes—and a physical capacity which may also be expressed in millions of bytes. The physical capacity is the sum of bytes which can be stored in all the useable data sectors on the disk drive, including user area 278, reserve area 276 and including spares 265. In both cases, there is an unexpressed but required "overhead" required to support the data sectors, including a framing pattern for detection of the data sector and a number of bytes in each data sector used for error correction which is additive to the nominal byte count e.g. 512 bytes of data plus 48 bytes of error correction redundancy.

Figure 2:
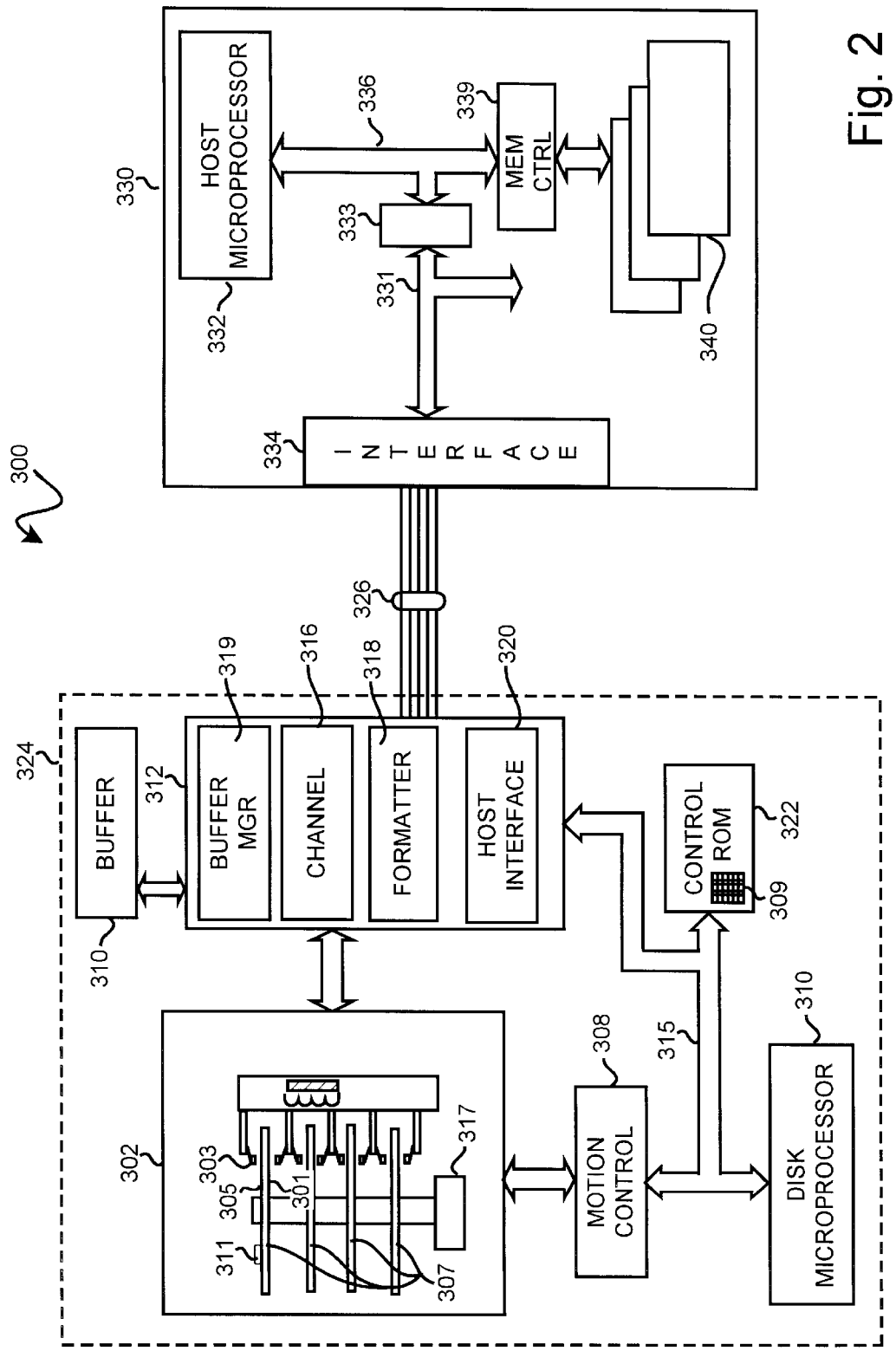
FIG. 2 is a computer system comprising a disk drive in accordance with the invention

Now turning to FIG. 2, a computer system according to the invention is shown comprising a disk drive 324 and a host computer 330. Host computer 330 includes a host microprocessor 332, a memory controller 339, a memory array 340, a PCI bus bridge 333, and disk drive interface logic 334.

Host microprocessor 332 is suitably a Pentium™ class microprocessor, however other microprocessor architectures may be used with equal advantage. A local bus 336 provides high speed transfers between host microprocessor 332 and memory controller 339. Memory controller 339 provides a interface to memory array 340 for host microprocessor 332 for instruction and data access.

Memory array 340 is a semiconductor memory array which may be implemented with any of a number of existing and proposed memory architectures which are known in the art including but not limited to SDRAM, Rambus, and double data rate (DDR) SDRAM.

PCI bus bridge 333 translates local bus 336 data access cycles into standard PCI (Peripheral Component Interface) cycles on an internal PCI bus 331 providing a standard interface for peripheral components. Internal PCI bus 331 provides access to peripheral components local to host computer 330 and to disk drive 324 through disk interface logic 334.

Disk interface logic 334 provides a host interface for disk drive 324 over host interface connection 326. In one embodiment, host interface connection 326 is a memory referenced interface such a PCI bus. In another embodiment, host interface connection 326 is an I/O interface such as an ATA interface or a SCSI interface. Host computer system 330 and disk drive 324 transfer commands, data and status via host interface connection 326 using protocols defined for the connection.

Disk drive 324 comprises a head disk assembly (HDA) 302, disk control circuitry 312, a buffer 313, motion control logic 308, a disk microprocessor 310, and a control ROM 322. HDA 302 comprises disks 307 (4 shown) each having an upper surface 305 and a lower surface 301 suitable for data storage. Each disk surface 301, 305 has a corresponding head Reducer 303 for reading and writing data.

Disk control circuitry 312 comprises conventional disk circuits for transferring data between host interface connection 326 and HDA 302 including formatter 318 and read/write channel 316. Buffer manager logic 319 provides control signals for buffer memory 313, which provides temporary storage of data transferred between HDA 302 and host computer 330. Host interface logic 320 provides decoding and control signals for interfacing to host interface connection 326, enabling disk drive 324 to transfer data, receive commands from and provide status to host computer 330.

A disk drive microprocessor 310 provides overall management of disk drive 324, executing programs stored in a control ROM 322. A bus 315 connects the drive microprocessor 310 to the control ROM 322, the disk control circuitry 312 and a motion control circuit 308. Motion control circuit 308 provides logic and drivers to move heads 303 over disk surfaces 305, 301 and to rotate disks 307 at a constant speed with a spindle motor 317 in IDA 302.

The structure described above enables the drive microprocessor 310 to have private control of resources within disk drive 324. In this regard the only direct access to programs and data stored in control ROM 322 is via bus 315. This ensures privacy of the ROM data from access external to disk drive 324 such as host computer 330. Further, data stored on disks 307 can only be accessed by actions in programs executed by drive microprocessor 310 resulting in setting up registers in disk control circuitry 312 and motion control circuit 308. This private control of resources affords drive microprocessor 310 a means for locking and unlocking features by validation of a key which includes a seed element as described below.

As indicated above, it is desirable to provide features which can be exploited to deliver added value to a user in exchange for compensation. This requires a secure way to lock and unlock such features to encourage payment. A preferred feature security apparatus includes a key or special code which can be validated to enable a feature set. Having a disk drive-based feature locking mechanism provides several advantages in security over a conventional feature locking/unlocking apparatus which uses the host microprocessor to perform such feature locking/unlocking. For one, code in control ROM 322 is secure from outside access, which prevents malicious program disassembly or decrypting of coded keys to avoid paying for features. For another, the disk drive has a unique identity which includes a serial number and other disk drive dependent characteristics which can be combined in numerous ways to form a drive-dependent identification which can serve as a seed element to form a key as described further below Preferably disk drive 324 includes a validation program 309 stored in control ROM 322. Additionally drive dependent identification data 311 is stored on one or more of disks 307 which can be privately accessed by drive microprocessor 310 while executing validation program 309. Alternatively, a portion of validation program 309 can be stored in reserve area 376 and loaded for execution into a RAM area in buffer 313, internal to drive microprocessor 310 or in an external RAM device to reduce the size of control ROM 322.

Figure 5:
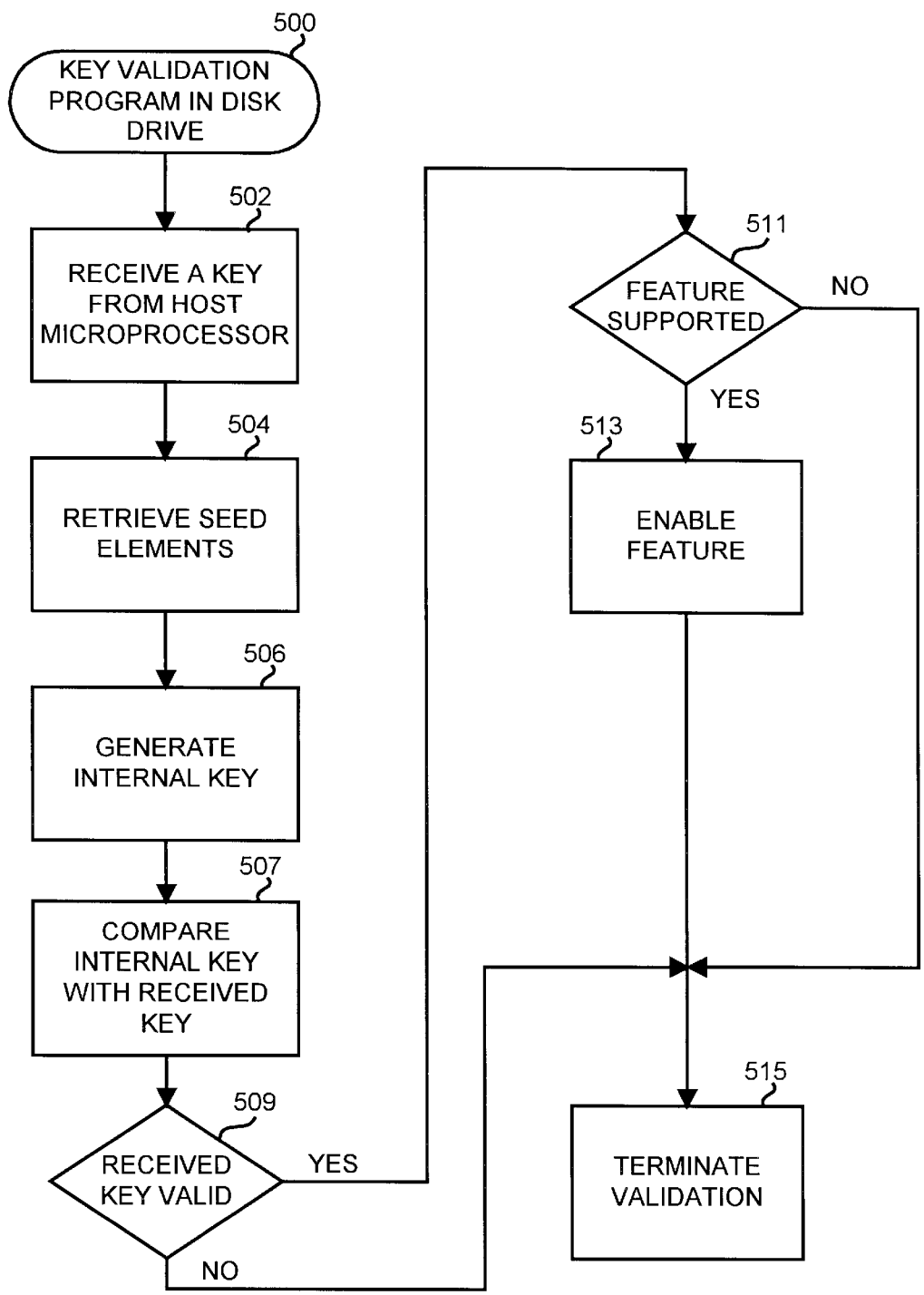
FIG. 5 is a flowchart illustrating the method of the invention for validating a key received from a host processor.

Turning to FIG. 5, a method 500 included in validation program 309 for performing validation of a key in the disk drive 324 is shown in flow chart form. The core process for generating an encrypted key may be derived from any suitable encrypting process which is designed to discourage counterfeiting. Numerous such algorithms are known in the art and may be practiced with equal advantage with the invention. Although performance would not be a driving factor, since the validation process is infrequent and not time critical, one selection criterion might be dependent on the amount of code required to be stored in control ROM 322 and possibly viewing the calculations required in light of the instruction set and hardware structures available in drive microprocessor 310. At 502, the drive microprocessor receives a key code from host microprocessor 332 via host interface connection 326 and host interface logic 320. Preferably the key is received in conjunction with a command for key validation. At 504 a set of seed elements is retrieved. The seed elements preferably are a combination of drive-dependent identification components comprising the disk drive serial number, a digital signature which may be derived during manufacturing of the drive, and a feature code which is designated for a particular feature. The digital signature can be formed for example by reading the amplifier gain setting for each head during calibration of the disk drive servo system and summing the gain values. This can provide a relatively unique signature since there will be significant variations in heads used in disk drives. Those skilled in the art will know that there are numerous drive dependent variables which can be combined in many ways to achieve a digital signature for the disk drive. In addition, during manufacture of the disk drive, an additional random seed element can be provided to the disk drive by a host computer used for test monitoring. In step 506, an internal key is generated using the validation program 309 and the seed elements. During disk drive manufacturing, the internal key is generated as in step 506 and provided to the test monitoring host computer for this later use in feature unlocking. Preferably drive microprocessor using the private means described above retrieves the seed elements from a seed element area 311 on one or more of disks 307 shown in FIG. 2.

In step 507, the internally generated key is compared with the key received from the host computer in step 502. At step 509 a test for validity of the received key is made. If the key is valid, a test is made at step 511 to verify that the feature is supported If the feature is supported, it is enabled at step 513 and the validation program is terminated. If the key is not valid, or if the feature is not supported, the program terminates at step 515 without unlocking a feature.

Figure 3:
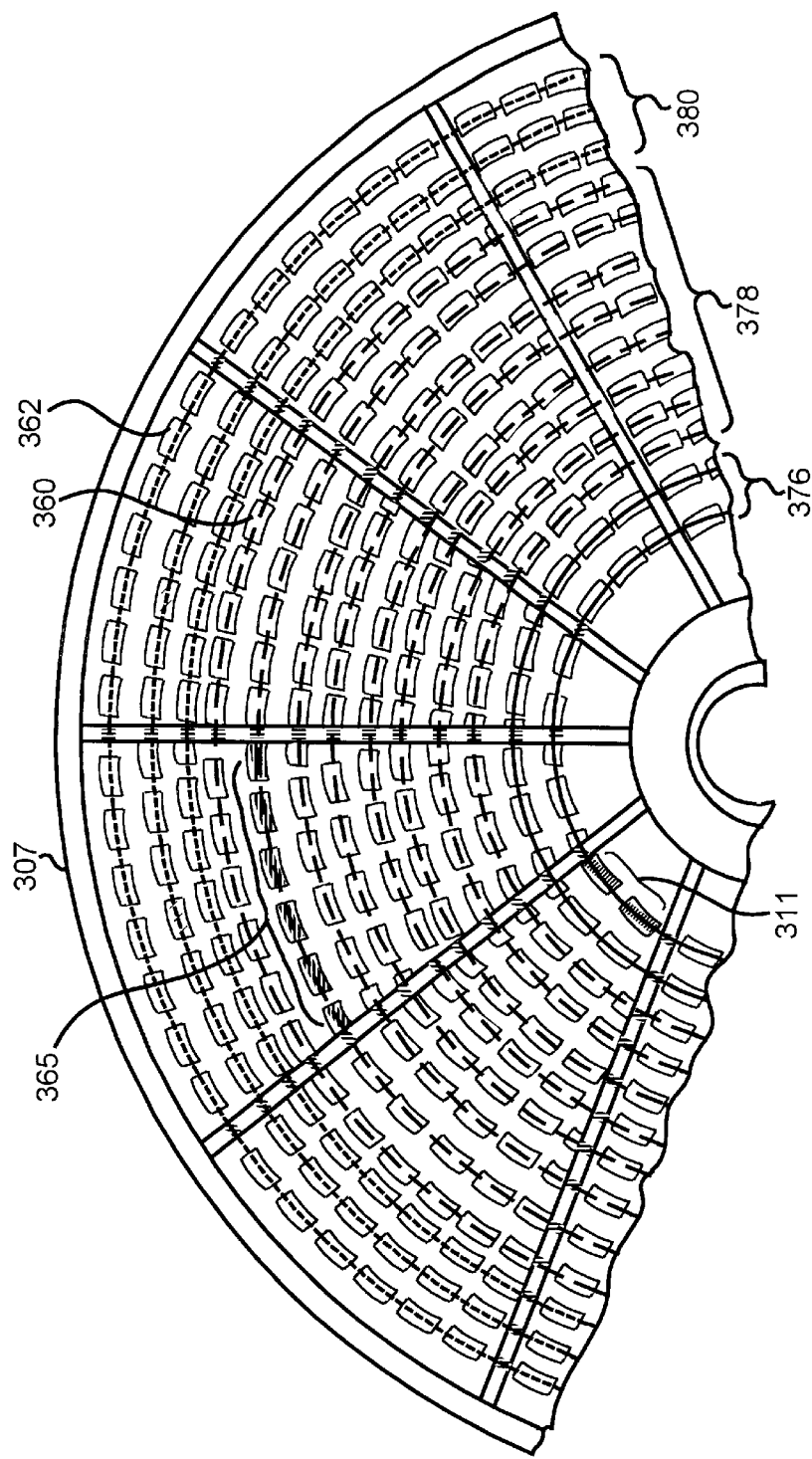
FIG. 3 is a portion of a disk surface in a disk drive according to the invention illustrating data sectors apportioned between user data, spares, reserve areas, and an expansion area, the sum of which comprises the physical capacity of the disk drive.

FIG. 3 illustrates a portion of disk 307 representing one embodiment used for providing a feature of expanded user capacity which can be enabled by the above-described key validation method and apparatus. Disk 307 has a reserve area 376 of cylinders for disk code and parameter storage shown as solid lines. Within reserve area 376 is the area 311 used for storing seed elements for key validation. User area 378 comprises a number of cylinders shown as dashed lines including data sectors 360 which are available for user data at the time of disk drive installation. Spares 365 are provided within user data area 378 for replacement of sectors which become unusable during operation of the disk drive 324. An expansion area 380 comprises cylinders shown as dotted lines and expansion data sectors 362 which are not available for user data until such time as a key is validated to enable access to the expansion area 380. Expansion area 380 is radially sequential to user area 378, providing a simple means of separating the two areas.

Figure 4:
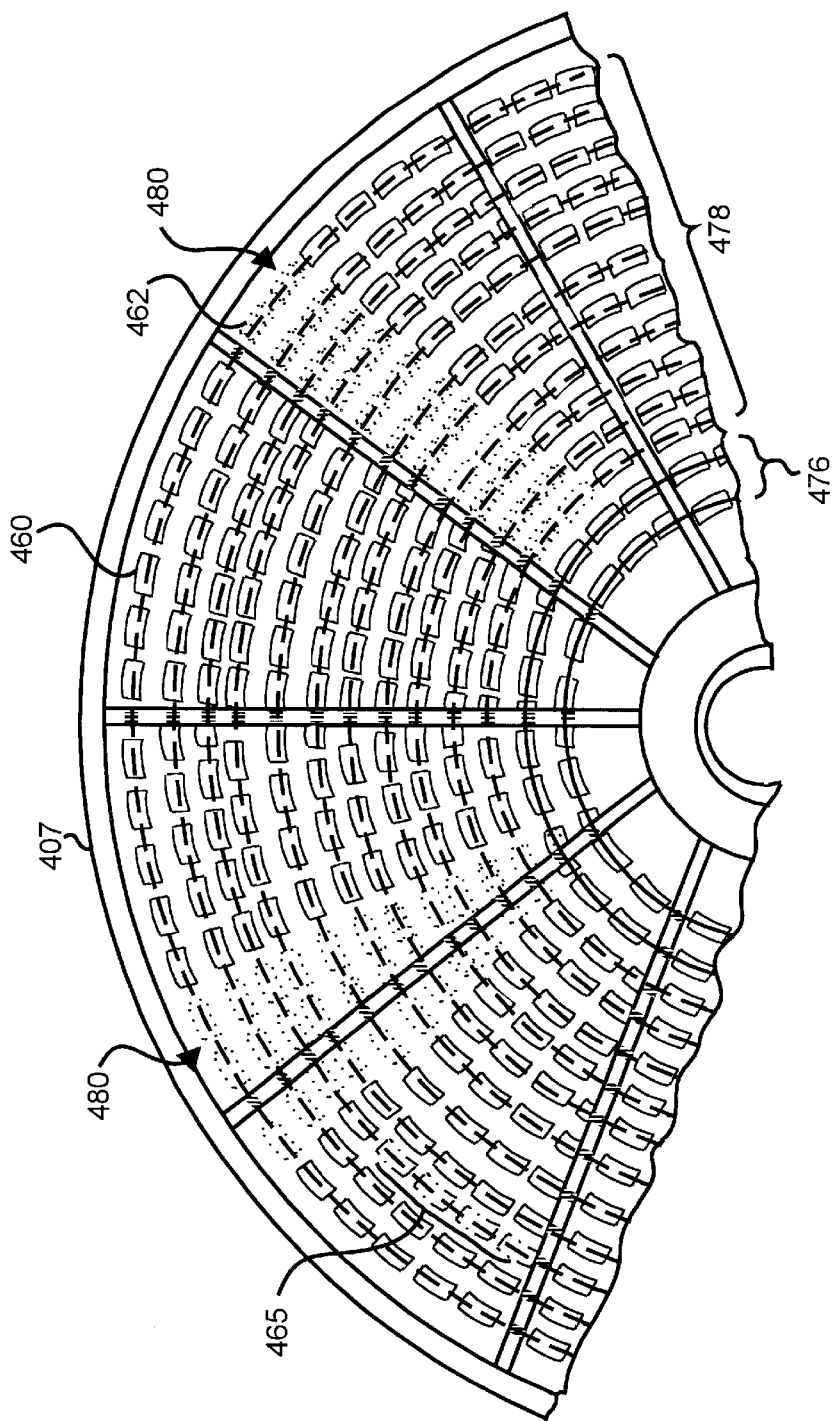
FIG. 4 is portion of a disk surface in another embodiment of the invention illustrating an alternative layout of the expansion area from that shown in FIG. 3.

The layout of FIG. 3 is but one of a large number of possible layouts of user area 378 and expansion area 380. In another embodiment, shown in FIG. 4, a comparable disk 407 has a user area 478 including user data sectors 460 and spares 465 encompassing the entire radial span of the disk beyond a reserve area 476. Expansion areas 480 having expansion sectors 462 are embedded and dispersed within user area 480. Other possible embodiments can simply dedicate an entire surface or an entire disk for expansion. The layout of user areas and expansion area will depend on design tradeoffs which may include performance being consistent before and after expansion—a requirement which generally points to using all heads in both cases; or reliability—which leans toward reserving a surface for expansion which is available in the event of a head failure on a previously active surface.

Once enabled, the expansion feature is incorporated into the operating parameters for the control program in control ROM 322 which are stored in non-volatile memory such as the reserve area 376. The disk drive is thus permanently re-characterized internally to the new larger user capacity. The user can then access the added capacity with a partitioning program presently provided in the marketplace such as Partition Magic TM or with a similar program provided by the disk drive manufacturer which allows for a disk drive to be reconfigured without requiring the operating system or application programs to be re-installed. Possibly a reconfiguration of BIOS parameters may be required depending on the particular BIOS being used. This type of BIOS reconfiguration is well known in the art.

By allowing for expansion or other features to be inherent in the disk drive and enabled by secure validation of a key, the drive manufacturer can be incented to competitively develop differentiating added value features while maintaining the appearance of a standard product from the OEM perspective. The OEM can in turn make use of such features to dynamically reconfigure product during the manufacturing process. An opportunity exists for reconfiguration at the point of sale as well. Additionally, the user can avoid the inconvenience and risk of disassembling his computer to install components or jumpers to provide expanded features. As such, there are many ways for the key code to be available for transmission by host microprocessor 332 to disk drive 324, including a user typing a code in response to a feature enabling program; a code being transmitted via a communication program from an enabling site such as a disk drive manufacturer's web site on the Internet, or an OEM's central system; or reading a code from a distribution media such as a CD-ROM or floppy disk.

We claim:

1. A disk drive having a drive microprocessor and a means for drive-dependent identification, the means for drive-dependent identification being privately accessible by the drive microprocessor, the disk drive further comprising:
   a means for receiving a key;
   a means for validating the key comprising:
      a validation program, the validation program being privately accessed and executed by the drive microprocessor;
      a seed component, the seed component being derived from the means for drive-dependent identification;
   a physical capacity, the physical capacity comprising the totality of useable data sectors addressable within the disk drive;
   the physical capacity further comprising:
      a reserve portion comprising a first number of data sectors;
      a spare portion comprising a second number of data sectors;
      a user portion comprising a third number of data sectors;
      an expansion portion comprising a fourth number of data sectors;
      the sum of the first, second, third, and fourth number of data sectors being equal to the physical capacity;
   a means for converting a fifth number of the expansion portion data sectors into user portion data sectors such that the third number is increased and the fourth number is decreased by the fifth number upon validation of the key by the means for validating the key.

2. The disk drive of claim 1 wherein the validation program is stored in a ROM.

3. The disk drive of claim 1 wherein the means for drive-dependent identification comprises a data sector in a reserve area of a disk.

4. The disk drive of claim 1 wherein the seed component comprises a serial number.

5. The disk drive of claim 1 wherein the seed component comprises a plurality of elements.

6. The disk drive of claim 1 wherein the expansion area is radially concatenated with the user area.

7. The disk drive of claim 1 wherein the expansion area is interspersed within the user area.

* * * * *